(12) United States Patent
Kremmer et al.

(10) Patent No.: US 10,676,090 B2
(45) Date of Patent: Jun. 9, 2020

(54) OSCILLATION DAMPING OF A SPRAYER BOOM OF AN AGRICULTURAL SPRAYING MACHINE

(71) Applicant: Deere & Company, Moline, IL (US)

(72) Inventors: Martin Kremmer, Mannheim (DE); Valentin Gresch, Ensheim (DE); Benedikt Jung, Kaiserslautern (DE)

(73) Assignee: Deere & Company, Moline, IL (US)

( * ) Notice: Subject to any disclaimer, the term of this patent is extended or adjusted under 35 U.S.C. 154(b) by 201 days.

(21) Appl. No.: 15/896,762

(22) Filed: Feb. 14, 2018

(65) Prior Publication Data

US 2018/0281798 A1      Oct. 4, 2018

(30) Foreign Application Priority Data

Mar. 29, 2017   (DE) .................. 10 2017 205 291

(51) Int. Cl.
*B60W 30/18*      (2012.01)
*A01M 7/00*       (2006.01)
(Continued)

(52) U.S. Cl.
CPC .... *B60W 30/18009* (2013.01); *A01M 7/0089* (2013.01); *A01C 23/00* (2013.01); *A01G 25/09* (2013.01); *A01M 11/00* (2013.01); *B60W 2300/154* (2013.01); *B60W 2400/00* (2013.01); *B60W 2530/00* (2013.01); *B60W 2720/106* (2013.01); *B60W 2720/24* (2013.01)

(58) Field of Classification Search
None
See application file for complete search history.

(56) References Cited

U.S. PATENT DOCUMENTS

| | | | | |
|---|---|---|---|---|
| 5,897,600 | A * | 4/1999 | Elmore | A01C 17/006 172/4.5 |
| 2014/0263766 | A1* | 9/2014 | Venton-Walters | A01G 25/09 239/726 |

(Continued)

FOREIGN PATENT DOCUMENTS

| | | |
|---|---|---|
| DE | 10054285 A1 | 5/2002 |
| DE | 102008007312 A1 | 8/2009 |

(Continued)

OTHER PUBLICATIONS

European Search Report issued in counterpart application No. 18164641.5 dated Sep. 6, 2018. (9 pages).

*Primary Examiner* — Richard M Camby

(57) ABSTRACT

An agricultural spraying machine having a defined transport width includes a chassis supported on the ground and configured to be set into motion in a forward direction, and a sprayer boom mounted on the chassis. A controller operably controls an actuator influencing the propulsion speed or driving direction of the chassis or the sprayer boom for reducing an oscillation of the sprayer boom in the forward direction. The controller triggers the actuator in response to a detected or expected oscillation of the boom due to a resulting change of speed or travel direction of the chassis or sprayer boom. An oscillation in an opposite phase to the detected or expected oscillation of the sprayer boom is induced in the sprayer boom adapted to lead to the reduction or cancellation of the oscillation of the sprayer boom.

16 Claims, 3 Drawing Sheets

(51) Int. Cl.
    *A01C 23/00*     (2006.01)
    *A01G 25/09*     (2006.01)
    *A01M 11/00*     (2006.01)

(56) References Cited

U.S. PATENT DOCUMENTS

| | | | |
|---|---|---|---|
| 2018/0110213 A1* | 4/2018 | Oberheide | A01M 7/0057 |
| 2018/0220638 A1* | 8/2018 | Gresch | A01M 7/0075 |

FOREIGN PATENT DOCUMENTS

| | | | |
|---|---|---|---|
| DE | 102011108480 A1 | 1/2013 | |
| DE | 102014203005 B3 | 5/2015 | |
| DE | 102015204992 B3 | 4/2016 | |
| DE | 102015101032 A1 | 7/2016 | |
| DE | 102015205905 A1 | 10/2016 | |
| DE | 102015113721 A1 | 2/2017 | |
| EP | 2526755 A1 | 11/2012 | |
| EP | 2589289 A2 | 5/2013 | |
| EP | 2829177 A1 | 1/2015 | |
| EP | 2835050 A1 | 2/2015 | |
| EP | 3132682 A1 | 2/2017 | |

\* cited by examiner

US 10,676,090 B2

OSCILLATION DAMPING OF A SPRAYER BOOM OF AN AGRICULTURAL SPRAYING MACHINE

RELATED APPLICATIONS

This application claims priority to German Patent Application Ser. No. 102017205291.0, filed Mar. 29, 2017, the disclosure of which is hereby expressly incorporated by reference in its entirety.

FIELD OF THE DISCLOSURE

The present disclosure to an agricultural spraying machine, and in particular to a spraying machine having a sprayer boom, a chassis on which the sprayer boom is mounted, and an electronic controller that is operable to control an actuator influencing the propulsion speed or driving direction of the chassis or of the sprayer boom for the purpose of reducing an oscillation of the sprayer in the forward direction.

BACKGROUND

Field sprayers are used in agriculture for distributing sprayed agents on a field for fertilizing the field or for combating undesired organisms present there, such as weeds, fungi or insects. They are available as self-propelled or towed designs, or attached to or seated on a carrier vehicle. In order to achieve a sufficient working width of several tens of meters, sprayers are equipped with booms that support spray nozzles and that can be adjusted between a folded transport position for traveling on roads and an extended working position for field operation. The booms are usually designed to be relatively rigid in the vertical direction in order to maintain a constant distance between the ground and the spray nozzles and thus guarantee maintenance of the desired discharge rates, while they are designed to be less stiff in the forward direction for reasons of weight and cost. This has the disadvantageous result, however, that the boom can undergo oscillating movements in the forward direction, for example, when the field sprayer or a vehicle carrying it is decelerated or accelerated or travels on a curve. The amplitude of such oscillating movements can be on the order of 1 m or more, which has the undesired consequence that the desired discharge rates are not maintained in certain places.

A number of measures have been proposed for detecting and combating such oscillating movements by means of an electronic controller. For instance, DE 100 54 285 A1 proposes to detect the movements of the boom in the forward direction and cancel them by actuators (arranged to the left and the right of the longitudinal axis) operating in the opposite direction, which act on the boom on both halves of the boom and are articulated at the other end to the frame of the field sprayer. For active oscillation canceling, DE 10 2015 113 721 A1 proposes to move the boom as a whole in the forward direction relative to the frame of the field sprayer in order to reduce the effects of linear decelerations or accelerations of the field sprayer on the boom, whereas it is proposed in DE 10 2015 204 992 B3 to cancel the oscillation of the boom by means of air-ejecting nozzles that are mounted on the boom.

DE 10 2008 007 312 A1 proposes to attach an oscillation damper composed of a mass and a spring to the outer end of each boom half. The mass is not actively driven and is intended to automatically cancel out the oscillating movements of the boom.

EP 2 526 755 A1, EP 2 589 289 A2, EP 2 835 050 A1 and EP 2 829 177 A1 propose to mount damping elements inside the boom, the damping properties of which can be modified based on the type of movement of the field sprayer.

EP 3 132 682 A1, which is considered to define the class of apparatus in question, proposes to detect future movements of the field sprayer anticipatorily and, for example, to reduce the propulsion speed of the field sprayer as gently as possibly when traveling on curves or during linear accelerations or decelerations in order to reduce undesired oscillations. With an actively adjustable boom, a pre-acceleration of the boom can be carried out prior to cornering so that the acceleration of the boom about the vertical axis during the actual cornering is reduced.

DE 10 2014 203 005 B3 proposes to apply, upon an adjustment command, a first signal to an actuator to adjust a field sprayer boom that is adjustable in height or is rotatable about an axis running in the forward direction, and then to apply a second signal which has the effect that the oscillation in the boom that was induced by the first signal is canceled out. This procedure cannot be transferred to the problems in the art, however, because the undesired oscillation of the boom is not initiated by adjustment commands to an actuator moving the boom but rather by the acceleration of the field sprayer.

The known measures for oscillation damping thus comprise active elements which (directly or via the field sprayer) act mechanically on the boom (e.g., DE 100 54 285 A1, DE 10 2015 113 721 A1, DE 10 2015 204 992 B3 and EP 3 132 682 A1), passive oscillation dampers (e.g., DE 10 2008 007 312 A1, EP 2 526 755 A1, EP 2 589 289 A2, EP 2 835 050 A1 and EP 2 829 177 A1) and a limitation of the linear acceleration of the field sprayer (e.g., EP 3 132 682 A1) or the boom (e.g., DE 10 2015 113 721 A1). The active and passive elements for oscillation damping require a relatively high expense, whereas the limitation of the linear acceleration of the field sprayer or the boom will scarcely be sufficient to effectively cancel out the oscillations of the boom.

SUMMARY

In one embodiment of this disclosure, an agricultural spraying machine includes a sprayer boom, a chassis supported on the ground and capable of being set into motion in a forward direction, on which the sprayer boom is mounted, wherein the sprayer boom has a width transverse to the forward direction that is a multiple of the transport width of the spraying machine, and an electronic controller that is operable to control an actuator influencing the propulsion speed or driving direction of the chassis or of the sprayer boom for the purpose of reducing an oscillation of the sprayer boom in the forward direction, wherein the controller is designed to trigger the actuator in response to a detected or expected oscillation of the boom in such a manner that due to the resulting change of speed or travel direction of the chassis or the sprayer boom, an oscillation in opposite phase to the detected or expected oscillation of the sprayer boom is induced in the sprayer boom, which leads to the reduction or cancellation of the oscillation of the sprayer boom.

In other words, an actuator that specifies the propulsion speed or travel direction of the chassis or the sprayer boom is controlled by an electronic control unit. The actuator can thus vary the propulsion speed of the sprayer boom by adjusting the propulsion speed of the chassis (and thus of the sprayer boom, which is mounted on the chassis rigidly or movably, i.e., displaceably in the forward direction or about the vertical axis) or by adjusting the position of the sprayer boom relative to the chassis in the forward direction. Analogously, the actuator can vary the travel direction of the sprayer boom by adjusting the steering angle of the chassis (and thus of the sprayer boom mounted fixedly or movably thereon) or by adjusting the position of the sprayer boom about the vertical axis relative to the chassis.

If the controller detects an oscillation in the forward direction of the sprayer boom (i.e., a movement of at least one part of the sprayer boom about the vertical axis) by means of a suitable sensor, or expects this on the basis of a speed change that has been or is about to be performed, it controls the actuator in such a manner that an oscillation in opposite phase is induced in the sprayer boom by an additional speed change, the oscillation leading to a reduction or cancellation of the oscillation of the sprayer boom. Accordingly, if the spraying machine is accelerated, for example, the outer ends of the sprayer boom will initially move to the rear relative to the chassis due to inertia and will periodically oscillate forward and backward from there. The excitation of higher oscillation modes is also possible. This oscillation by the change of speed is superimposed with an oscillation in opposite phase and thus canceled or reduced. Therefore, there is not only a reduced acceleration of the boom relative to an originally intended acceleration, as is provided in the prior art EP 3 132 682 A1 and DE 10 2015 113 721 A1, but the change of speed produces a damping oscillation superimposed on the incipient oscillation in the sprayer boom.

It is possible to proceed analogously for a steering movement by overlapping the incipient oscillation in the sprayer boom in opposite phase and thus damping the oscillation.

In one possible embodiment, the controller can be connected to a sensor for detecting an oscillation of the sprayer boom and be operable to trigger the actuator based on the detected oscillation. The sensor can be an inertial sensor coupled to the sprayer boom or a sensor detecting the distance between the chassis and the sprayer boom. In this case there is active closed-loop control (with feedback) in order to detect and cancel out the oscillations of the sprayer boom.

Moreover, the controller can be provided with information or information determined by sensors with regard to the response of the sprayer boom to an acceleration or change of direction of the chassis, and the controller can trigger the actuator based on a signal supplied regarding unintended acceleration of the chassis and on the information. Accordingly, this does not provide feedback but rather control with an open loop, which can use parameters of the sprayer boom determined by sensors if applicable. The controller in this embodiment can be operable to issue a first control signal to the actuator upon receipt of a control command for changing the speed or direction of the chassis and to issue a second control signal to the actuator thereafter. The second control signal is dimensioned so as to cancel an oscillation of the sprayer boom in the forward direction that had been induced by the first signal, or upon receipt of a signal detected by the sensor that indicates a change of speed or direction of the chassis, to issue a control signal to the actuator which is dimensioned so as to cancel out an oscillation of the sprayer boom in the forward direction that is induced in the sprayer boom by a change of speed or direction of the chassis.

The controller can be operable to determine accelerations acting on an operator of the spraying machine and to trigger the actuator in such a manner as to reduce the accelerations acting on the operator to a specifiable threshold value.

The actuator can be designed to influence the rotational speed of a drive engine or the transmission ratio of a drive transmission of the spraying machine or of a vehicle towing or supporting it or to move the sprayer boom relative to the chassis or to move a mass relative to the chassis.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
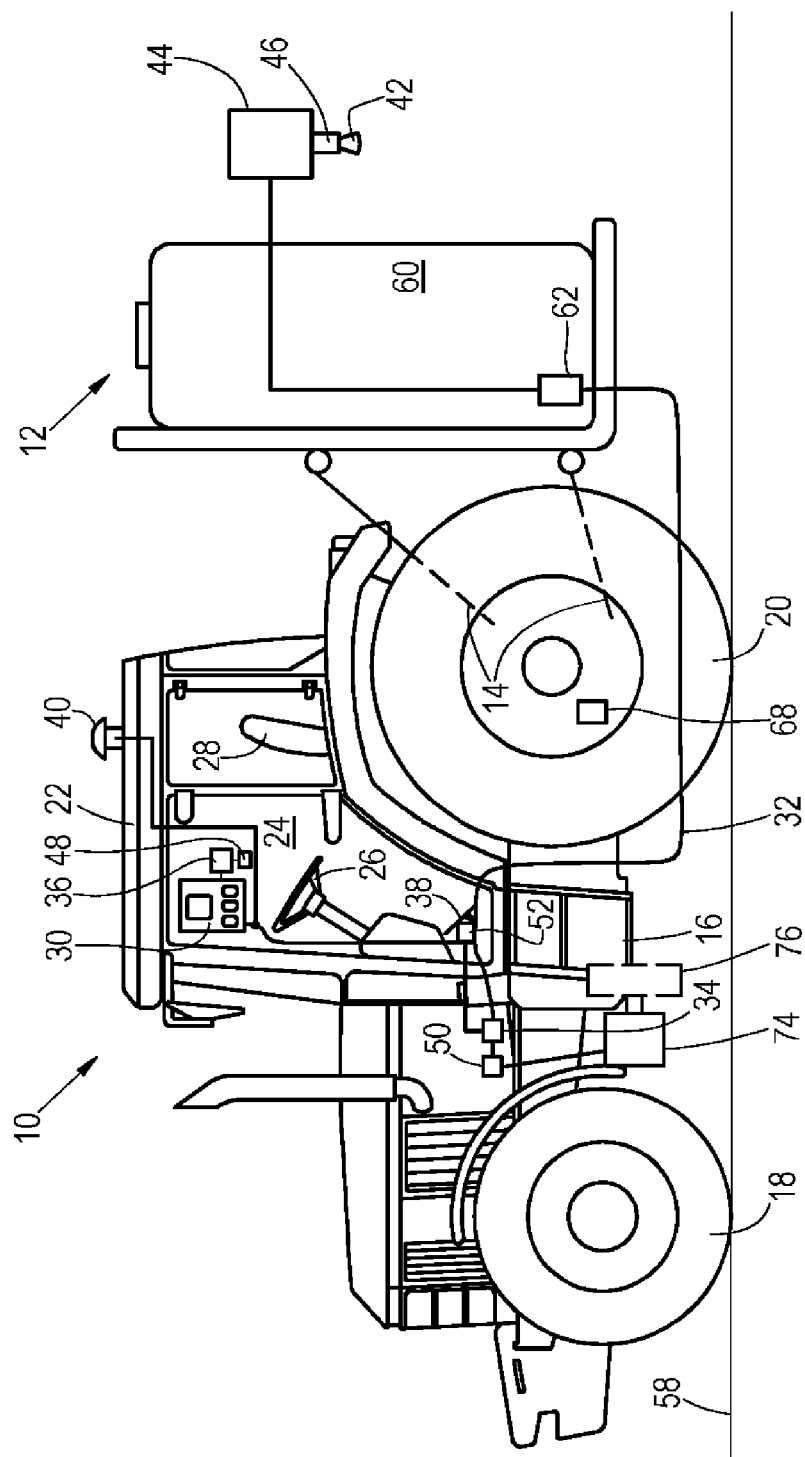
FIG. 1 is a side view of an agricultural machine with an associated controller.

FIG. 1 shows a side view of a spraying machine 12 in the form of a field sprayer that is attached to a three-point hitch 14 of an agricultural tractor 10. The tractor 10 is constructed on a frame 16, which is supported on steerable front wheels 18 and drivable rear wheels 20 and bears a cab 22, in which an operator workstation 24 is located. The operator work station 24 comprises a steering wheel 26, a seat 28, pedals 52 and a user interface 30. In a different embodiment, the spraying machine 12 can be towed by the tractor 10, i.e., it can comprise a frame having wheels and a drawbar attached to a coupling of the tractor 10, or can be designed as a self-propelled vehicle. In this case, the chassis would be formed by the chassis of the spraying machine 12 and the speed of the machine would be specified by the traction vehicle or the spraying machine 12 itself.

The user interface 30, which can be what is known as a virtual terminal, is connected to a data-transmission device 32, which can be a serial data bus in the illustrated embodiment. A work vehicle controller 34 of the tractor 10, a control unit 62 of the spraying machine 12 and a position-determination device 40 are additionally connected to the data-transmission device 32. All the above-mentioned devices exchange messages with one another via the data-transmission device 32 during the operation of the tractor 10. Additional control units (not shown) are generally connected to the data-transmission device 32, which can be combined into working sets that communicate jointly with the virtual terminal 30 and optionally other control units or working sets via the data-transmission device 32. The protocol used complies with ISO 11783. It would also be possible, however, to wire the above-mentioned devices together directly or to use any desired other protocol.

The position-determination device 40 receives signals from satellites and optionally terrestrial transmitters and determines therefrom the current position of the tractor 10 in at least two horizontal dimensions and also the speed and travel direction thereof. This data is transmitted by means of the data-transmission device 32 to, among others, a controller 36 that is integrated into the virtual terminal 30, but can also be separate therefrom.

The working vehicle controller 34 of the tractor 10 is connected to a speed control unit 50 that specifies the propulsion speed of the tractor 10, for example, by controlling the rotational speed of a drive engine 64 of the tractor 10 or by controlling the transmission ratio of a drive transmission 66 that drivingly connects the drive engine 64 to the wheels 20 and optionally 18. The drive transmission 66 can be a continuously variable, mechanical or hydrostatic or electrical or hybrid transmission.

The user steers the tractor 10 by means of the steering wheel 26 or by an automatic electronic steering control integrated into the user interface 30 and by steering actuators coupled thereto, which guide the tractor 10 across the field 58 based on a planned path stored in a memory device 48 of the controller 36 and on the signals of the position-determination device 40, particularly on the basis of existing travel lanes.

The control unit 62 of the spraying machine 12 is connected via the data-transmission device 32 or a separate connection to actuators 46, each of which is associated with an output device 42 designed as a nozzle of the spraying machine 12 and controls the rate with which the output device 42 discharges a sprayed agent from a supply container 60 onto the field. The output devices 42 are mounted on the spraying machine 12 via a sprayer boom 44 that can be folded up for road travel. The discharge rate of the output devices 42 can be controlled position-specifically, based on signals of the position-determination device 40 and a map of the field 58 stored in the memory device 48 with associated target values planned in advance, which can be supplemented with local sensors if desired.

During operation, the steering and speed of the tractor 10 are specified by an operator at the operator workstation 24 by means of the steering wheel 26 and the pedals 38 or a driving lever, which is not shown in FIG. 1. Alternatively, the steering can be accomplished by the steering controller, based on signals from the controller 36, which also can control the speed of the tractor via the transmission device 32, the working vehicle controller 34 and the speed control unit 50, insofar as this is not done by the operator via the pedals 38 or the drive lever.

Figure 2:
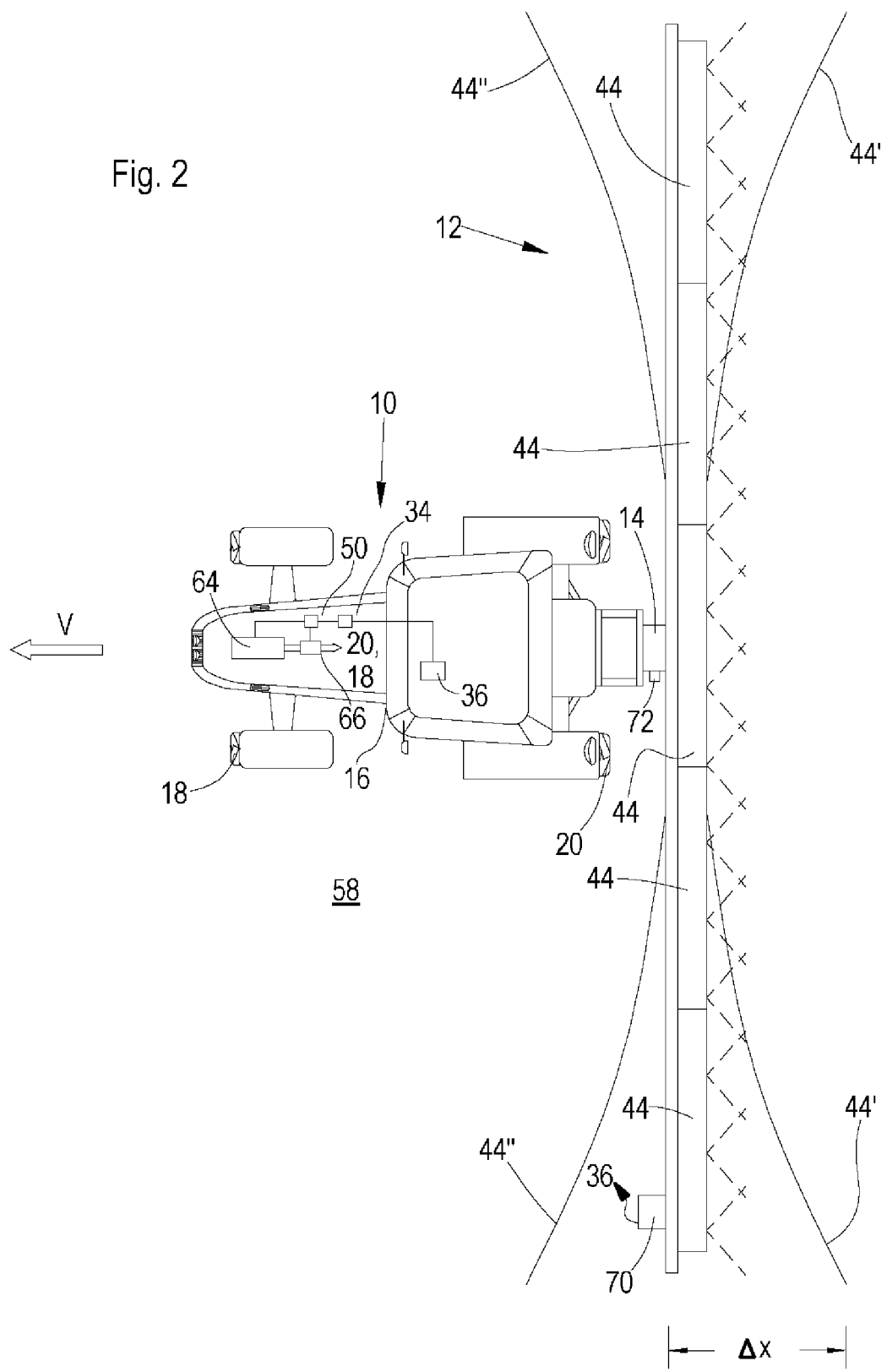
FIG. 2 is a plan view of the spraying machine.

The speed of the spraying machine 12 in the forward direction V across the field 58 is accordingly not necessarily constant, because the operator or the controller 36 may vary the propulsion speed v for various reasons, e.g., in order to slow down before a turn-around process and subsequently to accelerate again. Uneven or sloping ground can also lead to speed changes of the chassis 16. The relatively low rigidity of the sprayer boom 44 in the forward direction V causes the outer ends thereof to deflect to the rear relative to the chassis 16 of the spraying machine 12 during accelerations, as shown in FIG. 2 with the reference number 44', and then to carry out oscillations between a front reversal point, as shown in FIG. 2 with the reference number 44", and the original rear deflection point 44', the amplitude of which decreases over time. Such oscillations can also be induced in the sprayer boom 44 by an uneven ground profile of the field 58 being driven on. These oscillations have the effect that the desired distribution amounts are not maintained locally.

Figure 3:
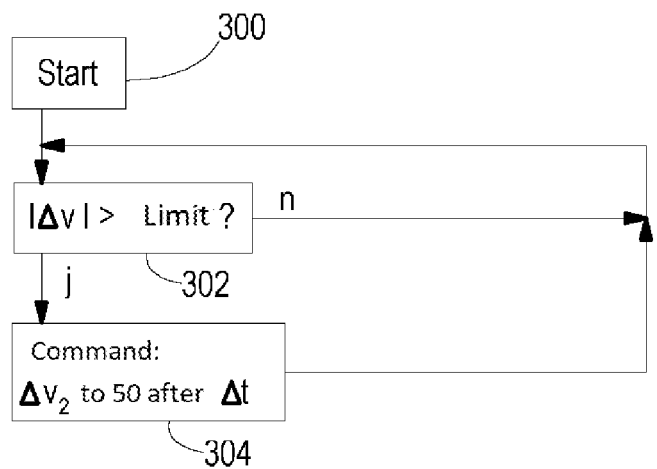
FIG. 3 is a flowchart according to which the controller of the spraying machine operates according to a first embodiment.

To avoid this disadvantage, the controller 36 in a first embodiment can proceed according to the diagram of FIG. 3. After the start in step 300, it is queried in step 302 whether a speed change $\Delta v$ (per unit time) is present. This speed change can be queried (especially if the speed v of the tractor 10 is specified manually) by a user by means of a sensor 68 that detects the rotational speed of one of the wheels 18, 20 or the ground speed of the tractor 10, for which a radar sensor can be used, for example. If the speed is controlled automatically by the controller 36, the latter can determine this speed change $\Delta v$ (per unit time) on its own. If there is no change of speed per unit time (or if there is one below a threshold that does not lead to an undesired movement of the sprayer boom 44), step 302 follows. Otherwise, step 304 follows, in which the controller 36, via the data-transmission device 32, transmits an instruction to the working vehicle controller 34 to change the current propulsion speed v after a time $\Delta t$ by a value $\Delta v_2$ with a predetermined acceleration.

The working vehicle controller 34 then controls an actuator of the internal combustion engine 64 or the drive transmission 66 in such a manner that the commanded change of speed $\Delta v_2$ results. This can be a deceleration or an acceleration, which is selected such that an impulse is exerted on the tractor 10, and thus the spraying machine 12 rigidly connected thereto, which has the effect that the previously existing oscillation is nearly or completely canceled by the oscillation induced in the sprayer boom 44 by the new impulse. The reader is referred in this regard to the disclosures of DE 10 2014 203 005 B3 and DE 10 2015 205 905 A1, which are hereby incorporated herein by reference. Step 302 again follows step 304.

The correct choice of the speed change $\Delta v_2$ and of the time $\Delta t$ in step 304 requires sufficient knowledge of the response of the sprayer boom 44 to a change of speed $\Delta v$. This can be determined on the basis of theoretical calculations or experiments on a spraying machine 12 of the respective type in use and can be programmed into the memory device 48 of the controller 36, i.e., the controller 36 detects the above-mentioned relationships regarding the design of this machine 12 based on information supplied to it via the data-transmission device 32 and stored in a memory device of the control unit 62, and drives the working machine controller 34 accordingly. Moreover, the oscillation behavior of the sprayer boom 44 can be determined once or from time to time in a test run, in which different speeds of the chassis 16 are activated by the controller 36, the determination using a sensor 70 that is mounted on the sprayer boom 44 and detects the oscillation behavior thereof. The sensor 70 can be designed as an inertial sensor and, in combination with the signals of an additional sensor 72, which can likewise be an inertial sensor that is mounted on the part of the spraying machine 12 fixedly connected to the tractor 10 or mounted on the tractor 10. The sensors 70, 72 can be used to determine the current deflection of the sprayer boom 44. The sensors 70, 72 can also determine the current deflection of the sprayer boom 44 in any other desired manner, e.g., by distance measurement. In conjunction with speed changes of the tractor 10 that are predetermined or undertaken by the operator, the controller 36 can accordingly determine said knowledge of the response of the sprayer boom 44 to a speed change $\Delta v$ and derive control parameters for the controller 36 therefrom.

Figure 4:
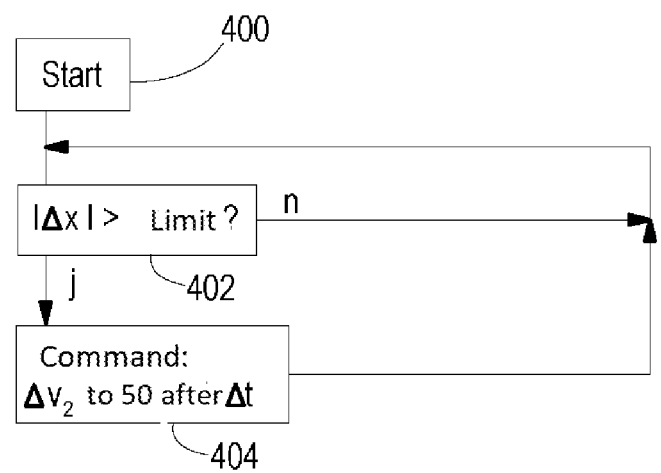
FIG. 4 is a flowchart according to which the controller of the field sprayer operates according to a second embodiment.

In the procedure shown in FIG. 4, it is queried in step 402, after the start in step 400, whether there is a deflection $\Delta x$ (cf. FIG. 2) of the sprayer boom 44 in the forward direction V. This deflection can be detected by using the sensors 70 and optionally sensor 72 mentioned above. If there is no deflection of the sprayer boom 44 in the forward direction V (or if there is one below a threshold that does not lead to an undesired movement of the sprayer boom 44), step 402 follows. Otherwise, step 404 follows, in which the controller 36, via the data-transmission device 32, transmits an instruction to the working vehicle controller 34 to change the current propulsion speed v after a time Δt by a value Δv₂ with a predetermined acceleration. This can be a deceleration or an acceleration, which is selected such that an impulse is exerted on the tractor 10, and thus the spraying machine 12 rigidly connected thereto, which has the effect that the previously existing oscillation of the sprayer boom 44 that has led to the deflection Δx is nearly or completely canceled by the oscillation induced in the sprayer boom by the new impulse. It is possible to proceed here as in the two foregoing paragraphs.

It should be noted that various modifications of the embodiments shown are possible. Thus, the acceleration acting on the operator of the spraying machine 12 can be determined in step 304 and 404 and, if the absolute value of the acceleration exceeds a threshold value, a small acceleration can be selected or steps 304 or 404 can be passed through several times with smaller acceleration.

The problem in relation to FIGS. 2-4 also occurs if the chassis 16 of the field sprayer 12 undergoes a change of direction. If the chassis 16 is steered to the right, for example, the outer ends of the sprayer boom 44 experience an acceleration rearward (right-hand side) or forward (left-hand side), which leads to opposite-phase oscillations of the two halves of the sprayer boom 44 due to the flexibility of the sprayer boom 44. By a steering movement analogous to the speed change of FIGS. 3 and 4, a second oscillation that cancels out the first oscillation can be generated. If the spraying machine 12 is automatically steered in the manner described above, the steering movement can be divided into two phases, in which the first steering movement generates the above-described oscillation and the second steering movement cancels it out. With skillful timing (phase selection Δt), the two steering movements can be made to run in the same direction so that excessive steering is not necessary.

While the sprayer boom 44 in FIGS. 1 and 2 is shown as being fixedly mounted on the chassis 16, it can also be mounted on the chassis so as to be movable by an adjustment drive (as in DE 10 2015 113 721 A1) that is not shown. The speed changes described in FIGS. 3 and 4 can be generated by this adjustment drive (alternatively or in addition to the speed change of the chassis 16 shown there). Analogously, the oscillation of the sprayer boom about the vertical axis as described in the previous paragraph can, alternatively or in addition to the change of direction of the chassis 16 shown there, be compensated by an adjustment drive that adjusts the sprayer boom 44 relative to the chassis about the vertical axis (as in EP 3 132 682 A1).

Finally, the change of speed of the chassis 16 implemented in steps 304 and 404 can be accomplished by means of a mass 76 displaceable in the travel direction that is shifted rearward or forward by means of an adjustment drive 74, alternatively or in addition to the adjustment of the rotational speed of the drive engine 64 and the transmission ratio of the drive transmission 66.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agricultural spraying machine having a defined transport width, comprising:
   a chassis supported on the ground and configured to be set into motion in a forward direction,
   a sprayer boom mounted on the chassis, the sprayer boom having a width transverse to the forward direction that is a multiple of the transport width of the spraying machine, and
   an electronic controller operably controlling an actuator influencing the propulsion speed or driving direction of the chassis or the sprayer boom for reducing an oscillation of the sprayer boom in the forward direction,
   wherein, the controller operably triggers the actuator in response to a detected or expected oscillation of the boom due to a resulting change of speed or travel direction of the chassis or sprayer boom,
   wherein, an oscillation in an opposite phase to the detected or expected oscillation of the sprayer boom is induced in the sprayer boom adapted to lead to the reduction or cancellation of the oscillation of the sprayer boom, and
   wherein the controller operably determines accelerations acting on an operator of the spraying machine and triggers the actuator in such a manner as to reduce the accelerations acting on the operator to a predefined threshold value.

2. The spraying machine of claim 1, wherein the controller is coupled to a sensor for detecting an oscillation of the sprayer boom and is operable to trigger the actuator based on the detected oscillation.

3. The spraying machine of claim 2, wherein the sensor comprises:
   an inertial sensor coupled to the sprayer boom, or
   a sensor configured to detect the distance between the chassis and the sprayer boom.

4. The spraying machine of claim 1, wherein the controller is provided with predefined information or information determined by sensors with regard to the response of the sprayer boom to an acceleration or change of direction of the chassis, the controller configured to trigger the actuator based on a signal supplied regarding unintended acceleration of the chassis and on the predefined information.

5. The spraying machine of claim 4, wherein the controller operably communicates a first control signal to the actuator upon receipt of a control command for changing the speed or direction of the chassis, and communicates a second control signal to the actuator thereafter, wherein the second control signal is dimensioned so as to cancel an oscillation of the sprayer boom in the forward direction that had been induced by the first signal.

6. The spraying machine of claim 4, wherein the controller operably communicates, upon receipt of a signal detected by the sensor indicative of a change of speed or direction of the chassis, a control signal to the actuator which is dimensioned so as to cancel out an oscillation of the sprayer boom in the forward direction that is induced in the sprayer boom by a change of speed or direction of the chassis.

7. The spraying machine of claim 1, wherein the actuator is designed to influence the rotational speed of a drive engine or transmission ratio of a drive transmission of the spraying machine or a vehicle towing or supporting movement of the sprayer boom relative to the chassis or to move a mass relative to the chassis.

8. A method for operating an agricultural spraying machine, comprising:

providing a chassis supported on the ground and configured to be set into motion in a forward direction, a sprayer boom mounted on the chassis, and an electronic controller operably controlling an actuator influencing the propulsion speed or driving direction of the chassis or the sprayer boom for reducing an oscillation of the sprayer boom in the forward direction;

detecting a first actual or expected oscillation of the sprayer boom;

triggering an actuator by the controller in response to the detecting step;

changing a speed or travel direction of the chassis or the sprayer boom;

detecting a second oscillation in an opposite phase to the detected first oscillation of the sprayer boom;

reducing the detected oscillation of the sprayer boom; and detecting a distance between the chassis and the sprayer boom with a sensor, wherein the triggering step include triggering the actuator based on the detected oscillation.

9. The method of claim 8, further comprising:

providing the controller with predefined information or information determined by sensors with regard to the response of the sprayer boom to an acceleration or change of direction of the chassis; and triggering the actuator based on a signal supplied regarding unintended acceleration of the chassis and on the predefined information.

10. The method of claim 9, further comprising:

communicating with the controller a first control signal to the actuator upon receipt of a control command for changing the speed or direction of the chassis, and communicating a second control signal to the actuator thereafter, wherein the second control signal is dimensioned so as to cancel an oscillation of the sprayer boom in the forward direction that had been induced by the first control signal.

11. The method of claim 9, further comprising communicating with the controller, upon receipt of a signal detected by the sensor indicative of a change of speed or direction of the chassis, a control signal to the actuator which is dimensioned so as to cancel an oscillation of the sprayer boom in the forward direction that is induced in the sprayer boom by a change of speed or direction of the chassis.

12. The method of claim 8, further comprising:

determining by the controller an acceleration acting on an operator of the spraying machine; and triggering the actuator to reduce the acceleration acting on the operator to a predefined threshold value.

13. The method of claim 8, further comprising influencing by the actuator a rotational speed of a drive engine or transmission ratio of a drive transmission of the spraying machine or a vehicle towing the sprayer boom.

14. An agricultural spraying machine having a defined transport width, comprising:

a chassis supported on the ground and configured to be set into motion in a forward direction;

a sprayer boom mounted on the chassis, the sprayer boom having a width transverse to the forward direction that is a multiple of the transport width of the spraying machine; and an electronic controller operably controlling an actuator influencing the propulsion speed or driving direction of the chassis or the sprayer boom for reducing an oscillation of the sprayer boom in the forward direction;

wherein, the controller operably triggers the actuator in response to a detected or expected oscillation of the boom due to a resulting change of speed or travel direction of the chassis or sprayer boom;

wherein, an oscillation in an opposite phase to the detected or expected oscillation of the sprayer boom is induced in the sprayer boom adapted to lead to the reduction or cancellation of the oscillation of the sprayer boom;

wherein, the controller is coupled to a sensor for detecting an oscillation of the sprayer boom and is operable to trigger the actuator based on the detected oscillation; and wherein the sensor includes:

an inertial sensor coupled to the sprayer boom, or a sensor configured to detect the distance between the chassis and the sprayer boom.

15. The spraying machine of claim 14, wherein the controller is provided with predefined information or information determined by sensors with regard to the response of the sprayer boom to an acceleration or change of direction of the chassis, the controller configured to trigger the actuator based on a signal supplied regarding unintended acceleration of the chassis and on the predefined information.

16. The spraying machine of claim 15, wherein the controller operably communicates a first control signal to the actuator upon receipt of a control command for changing the speed or direction of the chassis, and communicates a second control signal to the actuator thereafter, wherein the second control signal is dimensioned so as to cancel an oscillation of the sprayer boom in the forward direction that had been induced by the first signal.

* * * * *